H. Marshall,
Milk Pail.
No. 85,837.      Patented Jan. 12, 1869.
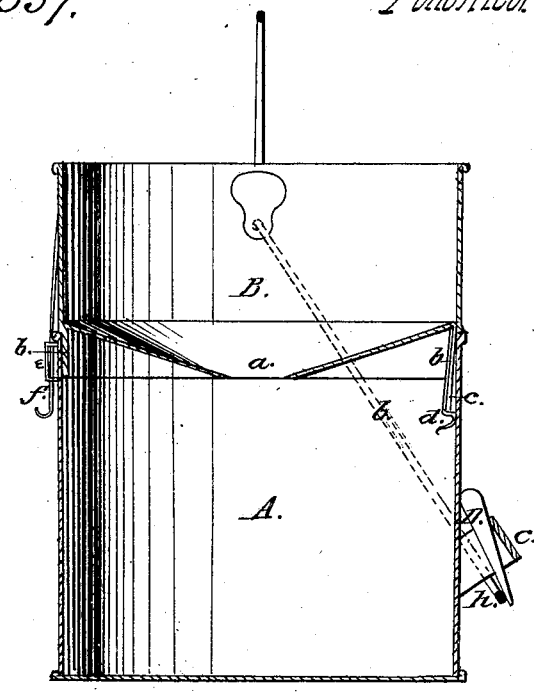

HAMMOND MARSHALL, OF ATLANTA, GEORGIA.

Letters Patent No. 85,837, dated January 12, 1869.

IMPROVEMENT IN MILK-PAILS.

The Schedule referred to in these Letters Patent and making part of the same.

*To all whom it may concern:*

Be it known that I, HAMMOND MARSHALL, of Atlanta, in the county of Fulton, and in the State of Georgia, have invented certain new and useful Improvements in Milk-Pails; and do hereby declare that the following is a full, clear, and exact description thereof, reference being had to the accompanying drawings, and to the letters of reference marked thereon.

The nature of my invention consists in the combination of a milk-pail and strainer so constructed and connected together that, in the event (and one that often occurs) of its being kicked or knocked over, it can be adjusted or set upright again before much milk can be lost.

In order to enable others skilled in the art to which my invention appertains, to make and use the same, I will now proceed to describe its construction and operation, referring to the annexed drawings, which form a part of this specification, and which represent a vertical section of my invention.

A represents a milk-pail or bucket, made of wood, tin, or any other suitable substance and size desired.

B represents a strainer placed on top of the bucket A, covering the entire top of the bucket, and provided with a funnel-shaped bottom, in the centre of which is an opening covered with wire gauze or cloth $a$, so that as fast as the milk falls into said strainer, it passes through the same perfectly clean and ready for use.

From the sides of the strainer B, a circular flange, $b$, projects down into the bucket, which flange fits tight into the same.

On the inside of the bucket A is a catch, $c$, under which a spring, $d$, placed on the flange $b$, hooks, and on the opposite side of the bucket A, but on its outside, is another catch, $e$, on to which another spring, $f$, hooks, this spring being secured to the outside of the strainer B.

By this means, the bucket and strainer are so connected together that if, while milking, or by any other accident, the pail is kicked or knocked over, it can be readjusted before much milk can be lost.

Instead of using the springs $d$ and $f$ for fastening the bucket and strainer together, I may for that purpose use the bail $h$ of the strainer, by passing the same under the handle C of the bucket, and then inserting a wedge, D.

The manner of fastening the bucket and strainer together I do not regard of much importance, only so that they are securely fastened.

Having thus fully described my invention,

What I claim as new, and desire to secure by Letters Patent, is—

The combination of the bucket A and strainer B, when constructed as described, and connected together substantially in the manner and for the purposes herein set forth.

In testimony that I claim the foregoing, I have hereunto set my hand, this 2d day of December, 1868.

HAMMOND MARSHALL.

Witnesses:
N. S. WALKER,
JOHN KNIGHT.